US012767511B2

(12) United States Patent
Zhou et al.

(10) Patent No.: US 12,767,511 B2
(45) Date of Patent: Oct. 20, 2026

(54) PORTABLE ELECTRIC CAN OPENER

(71) Applicant: Jiangmen Top Kitchen Electric Co., Ltd., Jiangmen (CN)

(72) Inventors: Jingsong Zhou, Jiangmen (CN); Xijian Liang, Jiangmen (CN)

( * ) Notice: Subject to any disclaimer, the term of this patent is extended or adjusted under 35 U.S.C. 154(b) by 71 days.

(21) Appl. No.: 18/987,562

(22) Filed: Dec. 19, 2024

(65) Prior Publication Data

US 2025/0115466 A1 Apr. 10, 2025

Related U.S. Application Data

(63) Continuation of application No. PCT/CN2023/134073, filed on Nov. 24, 2023.

(30) Foreign Application Priority Data

Dec. 1, 2022 (CN) ......................... 202223236287.7

(51) Int. Cl.
*B67B 7/00* (2006.01)

(52) U.S. Cl.
CPC .................................... *B67B 7/385* (2013.01)

(58) Field of Classification Search
CPC .. B67B 7/385; B67B 7/44; B67B 7/38; B67B 7/403; B67B 7/16; B67B 7/30; B67B 7/36; B67B 7/34; B67B 7/24; B67B 2007/303; B65B 69/00
USPC .... 30/400, 401.41, 416, 417, 424, 425, 426, 30/427; 7/152, 56; D8/18, 36
See application file for complete search history.

(56) References Cited

U.S. PATENT DOCUMENTS

| | | | | |
|---|---|---|---|---|
| 2,554,265 A * | 5/1951 | Parovel | B67B 7/385 | 30/425 |
| 3,768,159 A * | 10/1973 | Emmons | B67B 7/38 | 30/404 |
| 3,911,571 A * | 10/1975 | Ponczek | B67B 7/38 | 30/423 |
| 7,213,340 B1 * | 5/2007 | Lee | B67B 7/385 | 30/434 |
| 9,352,947 B2 * | 5/2016 | Mah | B67B 7/34 | |
| 9,630,825 B1 * | 4/2017 | Lee | B67B 7/385 | |
| D1,044,443 S * | 10/2024 | Wu | D8/36 | |
| 2007/0044326 A1 * | 3/2007 | Sanders | B67B 7/34 | 30/401 |

FOREIGN PATENT DOCUMENTS

| | | |
|---|---|---|
| CN | 201801373 U | 4/2011 |
| CN | 113548622 A | 10/2021 |

(Continued)

*Primary Examiner* — Ghassem Alie

(57) ABSTRACT

Disclosed is a portable electric can opener, including an opener body. A bottom wall of the opener body is bent to form an L-shaped mounting portion; the cutting wheel penetrates out of a vertical side wall of the L-shaped mounting portion; the driving wheel is penetrates out of a horizontal wall surface of the L-shaped mounting portion; with a structural center of gravity distribution of the driving wheel device, the can opener can be directly placed on a can body; after the can opener is started, the driving wheel moves towards the cutting wheel to clamp the rim of the can body and walks along a top of the rim of the can body, so that the cutting wheel cuts the rim of the can body to finally automatically complete lid opening, so as to free both hands.

10 Claims, 4 Drawing Sheets

(56) References Cited

FOREIGN PATENT DOCUMENTS

| | | | |
|---|---|---|---|
| CN | 114620664 | A | 6/2022 |
| CN | 219031725 | U | 5/2023 |
| EP | 0431517 | A1 | 6/1991 |

* cited by examiner

PORTABLE ELECTRIC CAN OPENER

CROSS-REFERENCE TO RELATED APPLICATIONS

The present application claims priority to Chinese Patent Application No. 202223236287.7, filed on Dec. 1, 2022, the entire disclosure of which is incorporated herein by reference.

TECHNICAL FIELD

The present disclosure relates to the field of can openers, and in particular to a small portable electric can opener.

BACKGROUND

A can opener is a household tool used to open cans. Can openers are divided into electric can openers and manual can openers. However, each electric can opener has a desktop structure, thereby making it inconvenient to carry. A user of a portable manual can opener should have certain physical strength, and it is very inconvenient for people with less physical strength.

The can openers are further divided into top-opening can openers capable of cutting top lids of cans, and side-opening can openers capable of side-cutting rims of cans. A manual side-opening can opener includes a cutting wheel for cutting a side part of a rim of a can body, and a traction wheel pressed against a top of the rim of the can body. A rotating handle mechanism of a side-opening can opener is capable of reducing a distance between the traction wheel and the cutting wheel to clamp the rim of the can body. A handle of the can opener is held by hand, and the rotating handle mechanism rotates to make the traction wheel walk at a top of the can body, such that the cutting wheel moves along a circumferential rim of the can body to cut the rim of the can body. A cut-off part can be used to cover an opening part and serve as a can lid.

When using the manual can opener, a user needs to hold the handle of the can opener with one hand to complete can opening, while needing to rotate the rotating handle mechanism with the other hand, that is, achievement only through one hand is impossible. Any people with hand injuries or failing to apply a force, and some special groups of people, can hardly use manual can openers. In the can opening process, the rotating handle mechanism is rotated by hand, and when the rotating handle mechanism is released, the distance between the traction wheel and the cutting wheel may change, such that clamping of the rim of the can body is loosened, and even the cutting wheel deviates from a cutting trajectory. Therefore, when the can is opened, the rotating handle mechanism needs to be constantly held to apply a force to avoid loosening, thereby making the entire can opening process laborious and complicated.

SUMMARY

In order to overcome the above defects in the prior art, the present disclosure provides a portable electric can opener.

A technical solution adopted by the present disclosure to solve the above technical problem is as follows:

a portable electric can opener includes an opener body, a driving wheel device and a cutting wheel; a support for mounting the driving wheel device is arranged inside the opener body, and a bottom wall thereof is bent to form an L-shaped mounting portion; the cutting wheel penetrates out of a vertical side wall of the L-shaped mounting portion; the driving wheel device includes a driving motor, a transmission gear mechanism, a transmission shaft, an elastic component and a driving wheel; the driving motor is arranged above a horizontal wall surface of the L-shaped mounting portion, the transmission shaft is movably connected to the support in a penetrating manner and arranged parallel to the driving motor, and the driving wheel is mounted at one end of the transmission shaft, penetrates out of the horizontal wall surface of the L-shaped mounting portion, and is located on a side of the cutting wheel; the other end of the transmission shaft is transmittingly connected to an output shaft of the driving motor by means of the transmission gear mechanism, the transmission gear mechanism comprises a driving gear respectively sleeved on the output shaft of the driving motor and a driven gear sleeved on the transmission shaft; the driven gear and the transmission shaft are sleeved and connected by means of a guide shaft sleeve, the guide shaft sleeve is provided with a guide groove on a side, the guide groove is provided with a guide slope with a height difference formed in an axial direction of the transmission shaft, a guide pin is radially connected to the transmission shaft in a penetrating manner and snap-fitted into the guide groove and abuts against the guide slope, and the driven gear is fixedly sleeved on the guide shaft sleeve; and the elastic component is sandwiched between the guide shaft sleeve and the support.

The cutting wheel is obliquely arranged in a walking direction, and an angle remains between a downward end thereof and the horizontal wall surface of the L-shaped mounting portion.

An inclination angle of the cutting wheel ranges from 5° to 30°.

The support includes a support housing and a metal inner support mounted in the support housing in an embedded manner, and the metal inner support includes a sleeve part for mounting the transmission shaft in a penetrating manner and a cutting wheel mounting part located below the sleeve part for mounting the cutting wheel.

One side of the driving wheel facing the cutting wheel is provided with a contact surface capable of increasing friction.

The elastic component is an elastic gasket.

A metal pad is mounted on the horizontal wall surface of the L-shaped mounting part.

The metal pad covers a magnet.

A clamp device is arranged in a tail part of the opener body.

The clamp device includes a toggle button and a metal clip that movably penetrates out of the tail part of the opener body by operating the toggle button, and a clamping groove is formed in a side part of the metal clip.

The present disclosure has the following beneficial effects: in the present disclosure, due to structural distribution of the driving wheel device, the center of gravity of the can opener is located at the top of the can body; in use, the can opener can be directly placed on the can body, and the rim of the can body is aligned and placed between the driving wheel and the cutting wheel; after the can opener is started, the driving wheel automatically moves towards the cutting wheel to clamp the rim of the can body and automatically walks along the top of the rim of the can body; and in the process of opening the can, the rim of the can body is always clamped, so that the cutting wheel cuts the rim of the can body to finally automatically complete lid opening, thereby making it easier to open the can without need of hands of a user.

BRIEF DESCRIPTION OF THE DRAWINGS

The present disclosure will be further described below with reference to the accompanying drawings and embodiments.

DETAILED DESCRIPTIONS OF THE EMBODIMENTS

Figure 1:
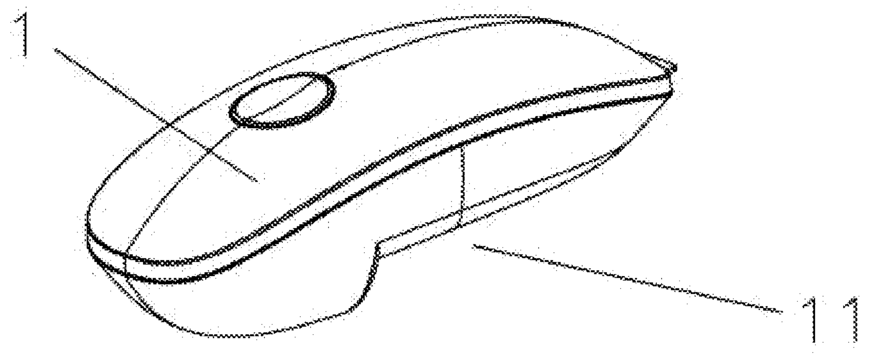
FIG. 1 is a structural schematic diagram of the present disclosure.
Figure 2:
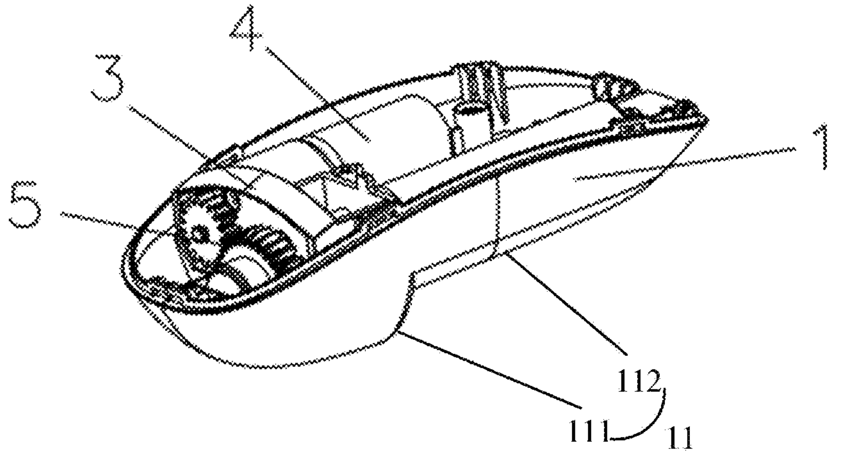
FIG. 2 is a schematic diagram of an internal structure of an opener body of the present disclosure.
Figure 3:
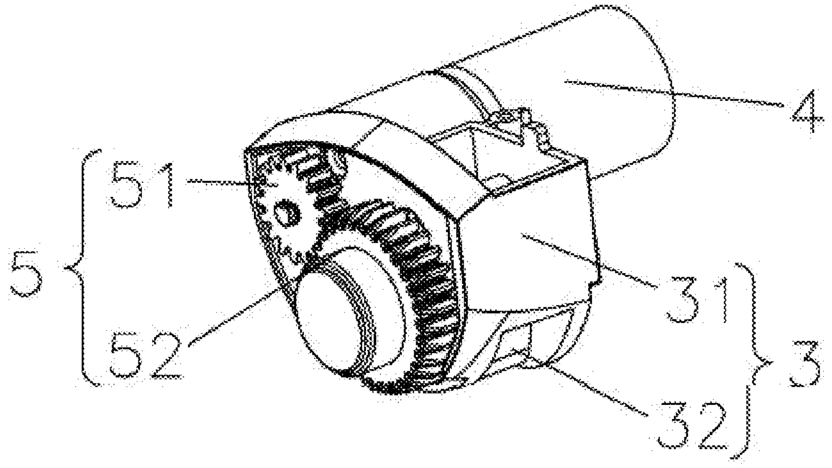
FIG. 3 is a structural schematic diagram of a driving wheel device of the present disclosure.
Figure 4:
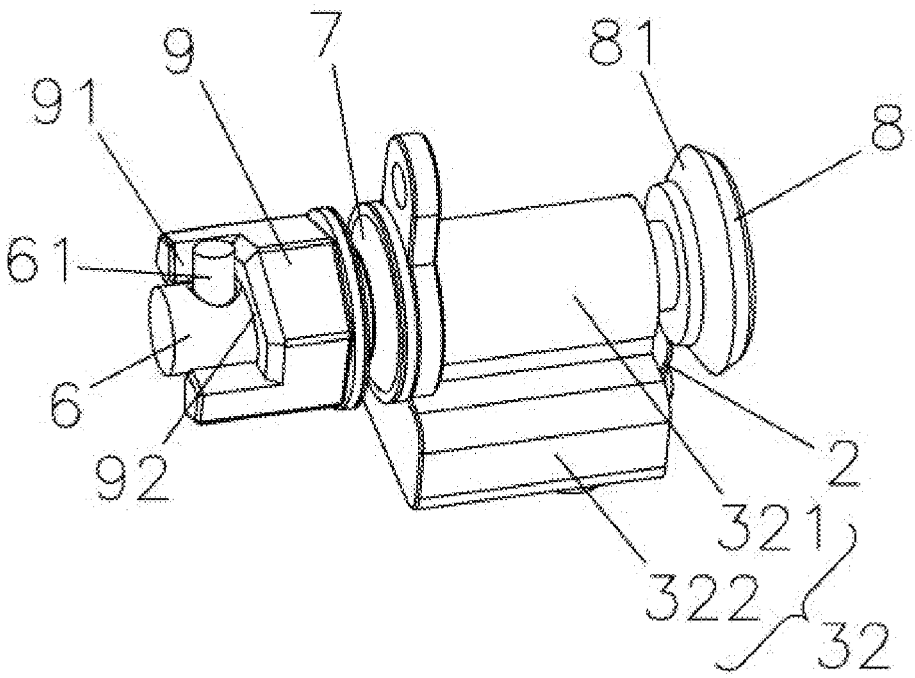
FIG. 4 is a schematic diagram of assembly of a transmission shaft, a driving wheel, a guide shaft sleeve and a cutting wheel.

With reference to FIGS. 1-4, a portable electric can opener includes an opener body 1, a driving wheel device and a cutting wheel 2.

The opener body 1 is formed by a housing and has an inner cavity, a support 3 for mounting the driving wheel device and a power supply are arranged inside the opener body 1, a bottom wall thereof is bent to form an L-shaped mounting portion 11, and the opener body 1, through the L-shaped mounting portion 11, is placed at a top of a can body.

The driving wheel device includes a driving motor 4, a transmission gear mechanism 5, a transmission shaft 6, an elastic component 7 and a driving wheel 8; and the driving motor 4 is installed and arranged above a horizontal wall surface 112 of the L-shaped mounting portion 11 through the support 3, such that a center of gravity of the opener body 1 is located at the top of the can body, and the opener body 1 can be stably placed on the can body.

The transmission shaft 6 is movably connected to the support 3 in a penetrating manner and arranged parallel to the driving motor 4, the driving wheel 8 is mounted at one end of the transmission shaft 6 and is located on a same side of the support 3 together with the driving motor 4; the driving wheel 8 penetrates out of the horizontal wall surface 112 of the L-shaped mounting portion 11 and abuts against a surface of the top of the can body; and the cutting wheel 2 penetrates out of a vertical side wall 111 of the L-shaped mounting portion 11 and is located on a side of a rim of the can body.

An output shaft of the driving motor 4 is located on the other side of the support 3 and is transmittingly connected to the other end of the transmission shaft 6 by means of the transmission gear mechanism 5.

The transmission gear mechanism 5 includes a driving gear 51 respectively sleeved on the output shaft of the driving motor 4 and a driven gear 52 sleeved on the transmission shaft 6; the driven gear 52 and the transmission shaft 6 are sleeved and connected by means of a guide shaft sleeve 9, the guide shaft sleeve 9 is provided with a guide groove 91 on a side, the guide groove 91 is provided with a guide slope 92 with a height difference formed in an axial direction of the transmission shaft 6, and a guide pin 61 is radially connected to the transmission shaft 6 in a penetrating manner and snap-fitted into the guide groove 91 and abuts against the guide slope 92; the driven gear 52 is fixedly sleeved on the guide shaft sleeve 9; and the elastic component 7 is sandwiched between the guide shaft sleeve 9 and the support 3. Under the action of the elastic component 7, the guide pin 61 can always be fitted on the guide slope 92 of the guide shaft sleeve 9. When not working, the guide pin 61 is always located at a lowest point of the guide slope 92.

After the can opener is started, the driving motor 4 starts working, the driving gear 51 on the output shaft of the driving motor 4 drives the driven gear 52 to rotate and simultaneously drives the guide shaft sleeve 9 to rotate, the guide shaft sleeve 9, by means of the guide slope 92 of the guide groove 91, pushes the guide pin 61, which drives the transmission shaft 6 to move horizontally and compress the elastic component 7, and the driving wheel 8, driven by the transmission shaft 6, automatically moves toward the cutting wheel 2 to clamp the rim of the can body, such that a blade of the cutting wheel 2 is inserted into the can body in a cutting manner. Due to a force applied by continuous rotation of the driven gear 52, the driving wheel 8 and the cutting wheel 2 always keep the rim of the can body in a clamped state, the driving wheel 8 automatically walks along a top of the rim of the can body, and the cutting wheel 2 cuts the rim of the can body to finally automatically complete lid opening.

After the lid opening is completed, the driving motor 4 of the can opener rotates reversely, and drives the guide shaft sleeve 9 to rotate through the transmission gear mechanism 5. Under the action of an elastic force from the elastic component 7, the guide pin 61 is driven to return to its origin, the transmission shaft 6 retreats to move the driving wheel 8 away from the cutting wheel 2 so as to release the clamping on the rim of the can body, and in this case, a separated part can be removed and used as a can lid.

The driving motor 4 may be a speed reduction motor, or the driving gear 51 may include a speed reduction gearset to increase a torque of the driving wheel 8, such that the driving wheel 8 can walk more smoothly along the top of the rim of the can body.

Figure 5:
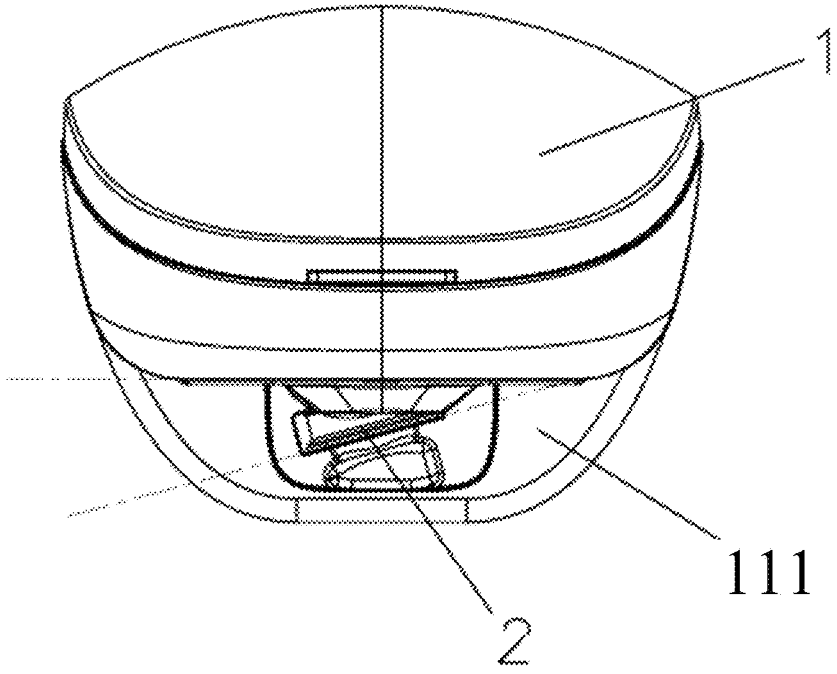
FIG. 5 is a schematic diagram of a cutting wheel obliquely arranged of the present disclosure.

Since an edge of the top of the can body of a can has a certain curvature, when the cutting wheel 2 is arranged horizontally, a cutting edge easily slips due to impact by the curvature, thereby causing failure to penetrate the can body in a cutting manner. Therefore, as illustrated in FIG. 5, the cutting wheel 2 is obliquely arranged in a walking direction in the present disclosure, a certain angle remains between a downward end thereof and the horizontal wall surface 112 of the L-shaped mounting portion 11, and an inclination angle ranges from 5° to 30°, such that the blade of the cutting wheel 2 penetrates the can body upwardly in an inclined cutting manner and always fits the edge of the top of the can body by overcoming the curvature. Moreover, cutting edges of the can body can be smoothened by rolling a bottom surface of the cutting wheel 2 after cutting, thereby reducing the risk of cutting hands.

The elastic component 7 can be a spring or an elastic gasket, as long as an elastic force is provided to make the guide pin 61 always fitted on the guide slope 92 of the guide shaft sleeve 9. Those skilled in the art can arrange according to their needs, so details are not described herein again.

Preferably, the elastic component 7 is an elastic gasket, which is easily mounted and has strong versatility, and a saddle-shaped elastic gasket or a corrugated elastic gasket can be used, which is easily replaced.

Preferably, the support 3 includes a support housing 31 and a metal inner support 32 mounted in the support housing 31 in an embedded manner, the driving motor 4 is mounted on the support housing 31, the metal inner support 32 includes a sleeve part 321 for mounting the transmission shaft 6 in a penetrating manner and a cutting wheel mounting part 322 located below the sleeve part 321 for mounting the cutting wheel 2, and a rigid metal material is used to improve a structure of clamping the rim of the can body in a more stable and reliable manner. In this example, the support housing 31 is made of a plastic material to reduce manufacturing costs. Further, one side of the driving wheel 8 facing the cutting wheel 2 is provided with a contact surface 81 capable of increasing friction, and the contact surface 81 can be a toothed surface or a silica gel surface made of a silica gel material to increase the friction with the edges of the can.

Figure 6:
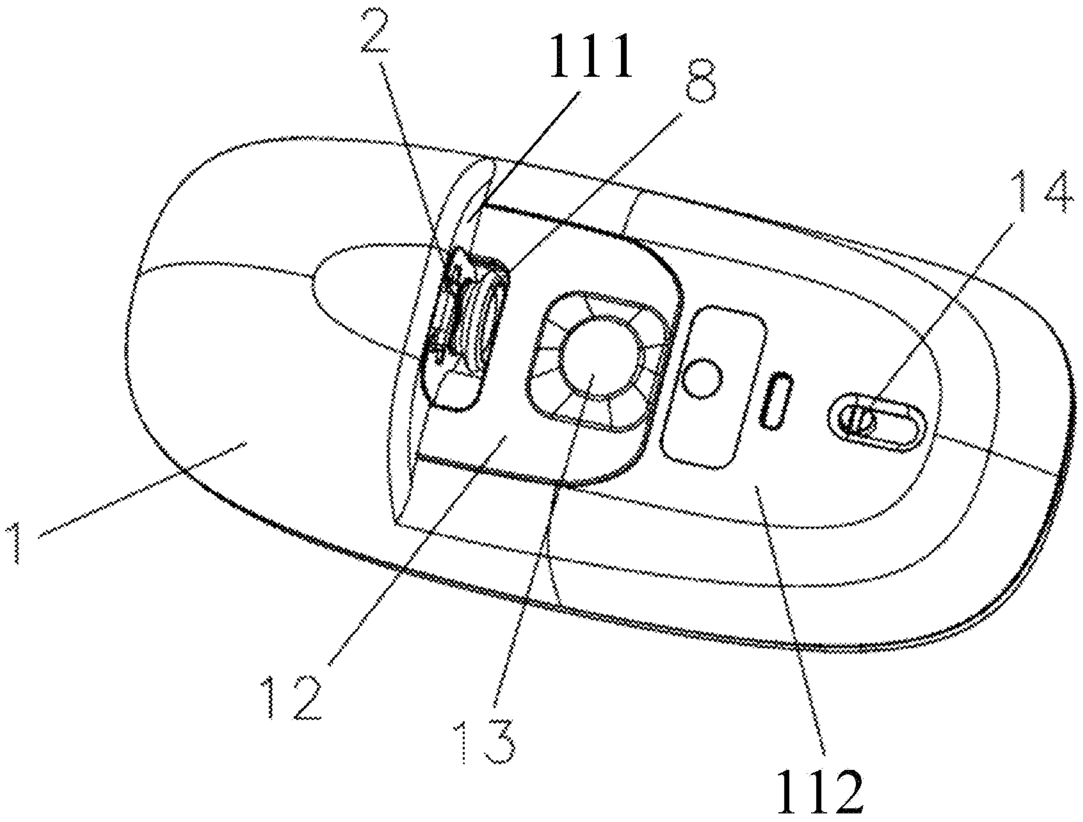
FIG. 6 is a structural schematic diagram of a bottom of an opener body.
Figure 7:
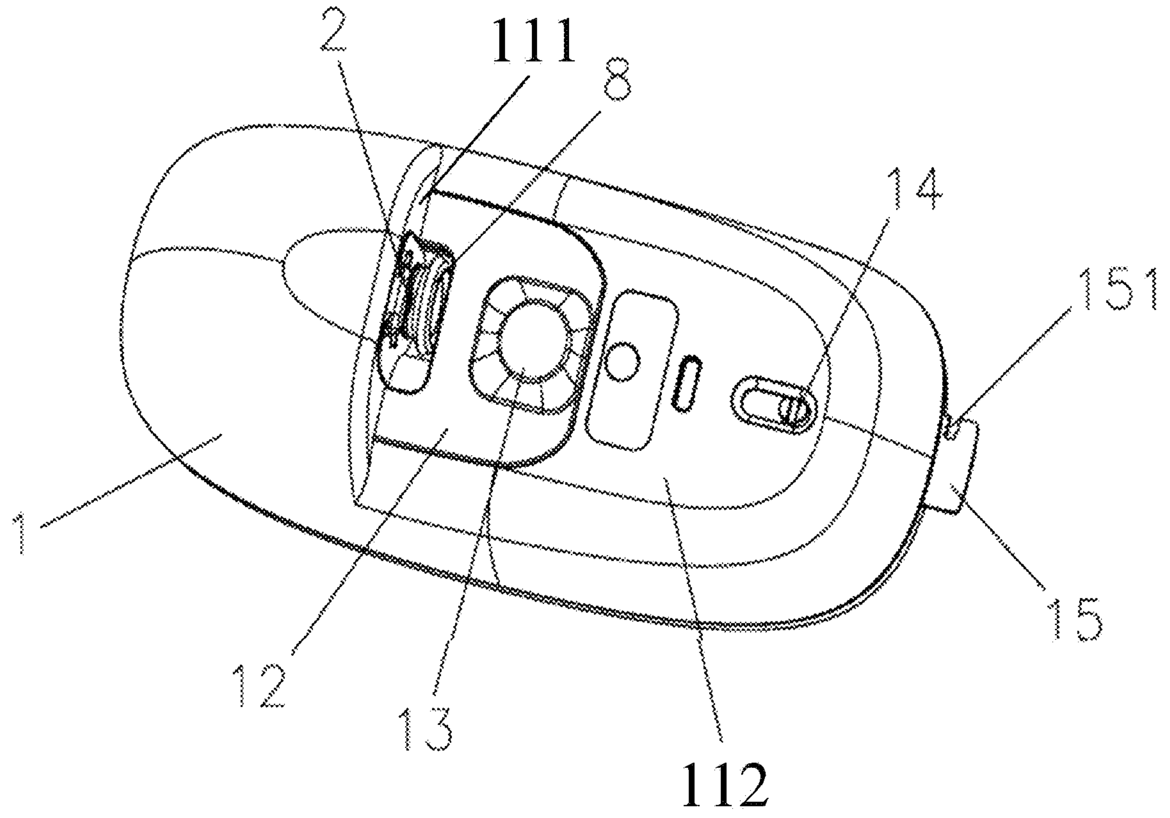
FIG. 7 is a structural schematic diagram of a metal clip that penetrates out of a tail part of the opener body in FIG. 6.

As illustrated in FIGS. 6 and 7, a metal pad 12 is mounted on the horizontal wall surface 112 of the L-shaped mounting part 11 and is in contact with the top of the can body, to prevent wear and damage. The metal pad 12 covers a magnet 13, such that the opener body 1 can be tightly adsorbed and placed on the top of the can, and after the can is opened, the can lid is sucked up. A clamp device is further arranged in a tail part of the opener body 1, and when the can lid is still attached to the can after the can opener cuts the can, the clamp device can be used to clamp an edge of the can lid to lift the can lid. The clamp device includes a toggle button 14 and a metal clip 15 that movably penetrates out of the tail part of the opener body 1 by operating the toggle button 14, a clamping groove 151 is formed in a side part of the metal clip 15, and when the edge of the can lid is clamped in the clamping groove 151, the toggle button 14 is pulled back to retract the metal clip 15 so as to clamp the can lid in the tail part of the opener body 1.

The present disclosure is capable of automatically completing the cutting and lid opening of the can body, thereby making it easier to open the can without need of hands of a user.

What is claimed is:

1. A portable electric can opener, comprising an opener body, a driving wheel device and a cutting wheel;

a support for mounting the driving wheel device is arranged inside the opener body, and a bottom wall thereof is bent to form an L-shaped mounting portion;

the cutting wheel penetrates out of a vertical side wall of the L-shaped mounting portion;

the driving wheel device comprises a driving motor, a transmission gear mechanism, a transmission shaft, an elastic component and a driving wheel;

the driving motor is arranged above a horizontal wall surface of the L-shaped mounting portion, the transmission shaft is movably connected to the support in a penetrating manner and arranged parallel to the driving motor, and the driving wheel is mounted at one end of the transmission shaft, penetrates out of the horizontal wall surface of the L-shaped mounting portion, and is located on a side of the cutting wheel; and another end of the transmission shaft is transmittingly connected to an output shaft of the driving motor by means of the transmission gear mechanism, the transmission gear mechanism comprises a driving gear respectively sleeved on the output shaft of the driving motor and a driven gear sleeved on the transmission shaft; the driven gear and the transmission shaft are sleeved and connected by means of a guide shaft sleeve, the guide shaft sleeve is provided with a guide groove on a side, the guide groove is provided with a guide slope with a height difference formed in an axial direction of the transmission shaft, and a guide pin is radially connected to the transmission shaft in a penetrating manner and snap-fitted into the guide groove and abuts against the guide slope; the driven gear is fixedly sleeved on the guide shaft sleeve; and the elastic component is sandwiched between the guide shaft sleeve and the support.

2. The portable electric can opener according to claim 1, wherein the cutting wheel is obliquely arranged in a walking direction, and an angle remains between a downward end thereof and the horizontal wall surface of the L-shaped mounting portion, wherein the walking direction refers to a tangential direction of a rim of a can body when the portable electric can opener travels circumferentially around a can lid during operation.

3. The portable electric can opener according to claim 2, wherein an inclination angle of the cutting wheel ranges from 5° to 30°.

4. The portable electric can opener according to claim 1, wherein the support comprises a support housing and a metal inner support mounted in the support housing in an embedded manner, and the metal inner support comprises a sleeve part for mounting the transmission shaft in a penetrating manner and a cutting wheel mounting part located below the sleeve part for mounting the cutting wheel.

5. The portable electric can opener according to claim 1, wherein one side of the driving wheel facing the cutting wheel is provided with a contact surface capable of increasing friction.

6. The portable electric can opener according to claim 1, wherein the elastic component is an elastic gasket.

7. The portable electric can opener according to claim 1, wherein a metal pad is mounted on the horizontal wall surface of the L-shaped mounting part.

8. The portable electric can opener according to claim 7, wherein the metal pad covers a magnet.

9. The portable electric can opener according to claim 1, wherein a clamp device is arranged in a tail part of the opener body.

10. The portable electric can opener according to claim 9, wherein the clamp device comprises a toggle button and a metal clip that movably penetrates out of the tail part of the opener body by operating the toggle button, and a clamping groove is formed in a side part of the metal clip.

* * * * *